United States Patent [19]

Jordan

[11] 4,211,655
[45] Jul. 8, 1980

[54] UPFLOW FILTER CONSTRUCTION

[75] Inventor: Edward J. Jordan, Willoughby, Ohio

[73] Assignee: Jet Aeration Company (Jet Inc.), Cleveland, Ohio

[21] Appl. No.: 851,044

[22] Filed: Nov. 14, 1977

[51] Int. Cl.$^2$ .................... B01D 23/16; B01D 23/18
[52] U.S. Cl. ............................. 210/108; 210/143; 210/206; 210/258; 210/275; 210/281; 210/284; 210/170; 210/293; 210/311
[58] Field of Search ............... 210/17, 59, 62, 73 S, 210/74, 80, 82, 86, 97, 108, 143, 153, 170, 254, 256, 258, 260, 262, 264, 266, 275, 281, 284, 285, 286, 291, 293, 311, 196, 206; 239/193, 194

[56] References Cited

U.S. PATENT DOCUMENTS

| | | | |
|---|---|---|---|
| 584,736 | 6/1897 | Goodhue | 210/256 |
| 964,694 | 7/1910 | Richert | 210/264 |
| 1,465,968 | 8/1923 | Caps | 210/286 |
| 2,760,643 | 8/1956 | Schaaf | 210/293 |
| 2,785,123 | 3/1957 | Stroud | 210/80 |
| 3,134,735 | 5/1964 | Greenleaf, Jr. | 210/264 |
| 3,642,134 | 2/1972 | Reckers | 210/80 |
| 3,771,655 | 11/1973 | Hudson, Jr. | 210/264 |
| 3,950,252 | 4/1976 | Jordan et al. | 210/284 |

Primary Examiner—Charles N. Hart
Assistant Examiner—Peter A. Hruskoci
Attorney, Agent, or Firm—Woodling, Krost & Rust

[57] ABSTRACT

An upflow filter usable with a home sewage treatment plant, and including a container therefor. The container comprises a dividing wall extending thereacross dividing it into first and second filtering chambers, each of which has a grating therein serving to divide each filtering chamber into top and bottom portions. Each grating is adapted to support thereon a filtering media. The container has an inlet and an outlet, with there being provided a vertical opening or passage in the dividing wall in communication with said inlet, and with such passage having lateral exit openings communicating the vertical passage with the respective filtering chamber, adjacent the bottom thereof. A well is provided in the dividing wall downstream from the vertical passage. Another portion of the dividing wall along its top surface downstream from the well defines a conduit, such conduit being adapted to receive liquid from the first and second filtering chambers thereinto, and removable means in the conduit for providing weirs therein, for providing for the entrance of liquid into the conduit from said filtering chambers. Other removable means are provided for selectively connecting the conduit to either the well or to the aforementioned outlet.

19 Claims, 13 Drawing Figures

UPFLOW FILTER CONSTRUCTION

This invention relates to an apparatus for the treatment of sewage effluent and is adapted for use for instance, with a sewage treatment system used by a homeowner where city sewage treatment systems are not available. More particularly, the invention relates to an upflow filter construction of the above general type, that enables a distributor to inventory one construction of filter, and by removing a few simple "knock-out" or removable sections in the structure, and/or making parts addition thereto, the filter can perform different functions, and can be used in different environmental or physical situations.

BACKGROUND OF THE INVENTION

Various types of upflow filter constructions and methods are known in the prior art. One such arrangement is shown in U.S. Pat. No. 3,642,134, dated Feb. 15, 1972. Another such arrangement is disclosed in U.S. Pat. No. 3,950,252, dated Apr. 13, 1976 and assigned to the Assignee of this application. U.S. Pat. No. 3,950,252 discloses a somewhat similar structural arrangement of filter as the present invention, except that the filter construction illustrated is not readily adaptable for use to perform different functions, and ordinarlly requires a distributor to stock a plurality of filter constructions in order to perform satisfactorily under different physical situations.

SUMMARY OF THE INVENTION

The present invention provides an upflow filter which includes a container having a wall extending thereacross to divide the container into first and second filtering chambers, with the dividing wall comprising generally an L-shape in side elevation, and having a vertical opening cast into the dividing wall and extending from the top edge portion thereof substantially to the bottom of the container, with lateral exit portions communicating the bottom of the filtering chambers with the vertical passage, and with another portion of the dividing wall along its top edge providing conduit means defining a passage having removable sections or knock-outs formed therein to provide, upon removal thereof, weirs for entrance of liquid from the filtering chambers into the passage, and wherein the filter container has various other knock-out or removable sections, so that the filter can effectively perform under different physical situations, upon selectively knocking out the removable or knock-out sections, thereby enabling a distributor to inventory one structural arrangement of filter for use in varied job requirements.

Accordingly, an object of the invention is to provide a novel upflow filter construction.

Another object of the invention is to provide an upflow filter construction which enables one filter construction to be utilized for different types of job requirements by selectively removing or knocking out sections of the filter structure so that the filter can perform differently depending upon the job requirements.

Another object of the invention is to provide an upflow filter comprising a generally rectangular-shaped, cast, concrete container having an inlet and an outlet for liquid, an open top, a bottom wall and four side walls, and having a concrete dividing wall integral with and extending between two opposed side walls, thereby forming first and second filtering chambers, with the dividing wall having first and second end portions and an intermediate portion therebetween, with the first end portion and intermediate portion each having a top edge, which is at a higher vertical level than the top edge portion of the second end portion, and with the dividing wall comprising a generally L-shape in side elevation, and with the top edge of the first end portion and the intermediate portion being on the high part of the L-shape, and the top edge of the second end portion being on the low part of the L-shape, and with a vertical opening and an adjacent well cast into the dividing wall, and extending from the top edge portion of the dividing wall substantially to the bottom of the container, and with the vertical opening having first and second lateral exit portions that communicate with the bottom of the first and second filter chambers, and with a channel means integrally formed on the top edge of the second end portion of the dividing wall defining a passage connectable to a liquid outlet, and with various knock-out sections provided in the filter structure for selective removal, so that the filter can be utilized to perform effectively under varied job requirements.

Other objects and advantages of the invention will be apparent from the following description taken in conjunction with the accompanying drawings, wherein.

DESCRIPTION OF PREFERRED EMBODIMENTS

Figure 1:
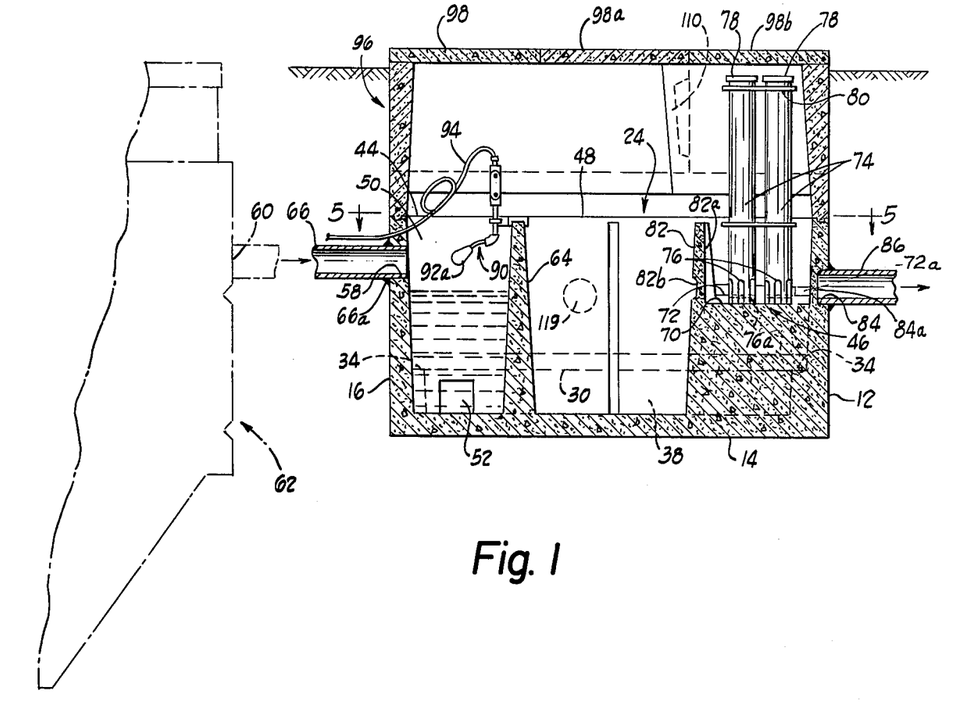
FIG. 1 is a side elevational view in section of an upflow filter embodying the invention, and taken generally along the line 1—1 of FIG. 3.
Figure 2:
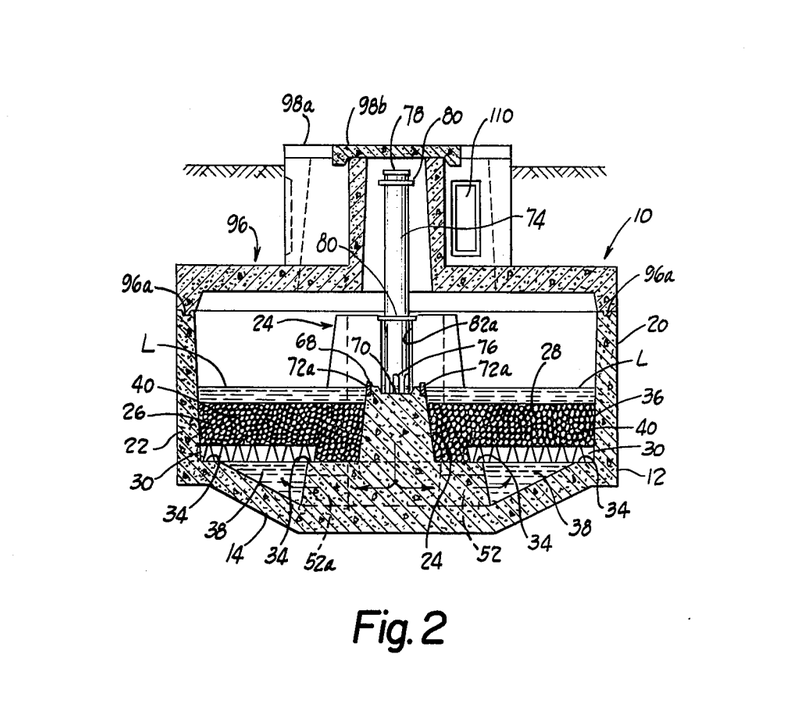
FIG. 2 is an end view in section of the filter of FIG. 1, and taken generally along the line 2—2 of FIG. 3.
Figure 3:
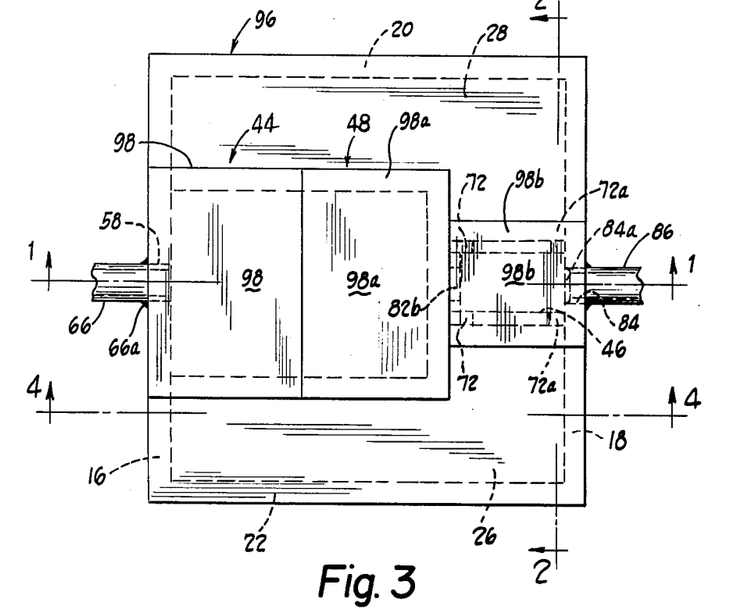
FIG. 3 is a plan view of the filter of the present invention.
Figure 4:
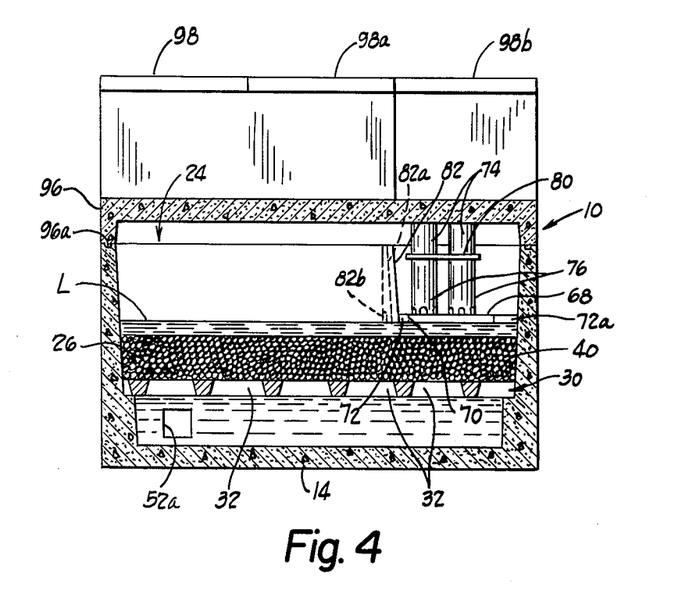
FIG. 4 is a sectional view taken generally along the plane of line 4—4 of FIG. 3, looking in the direction of the arrows.
Figure 5:
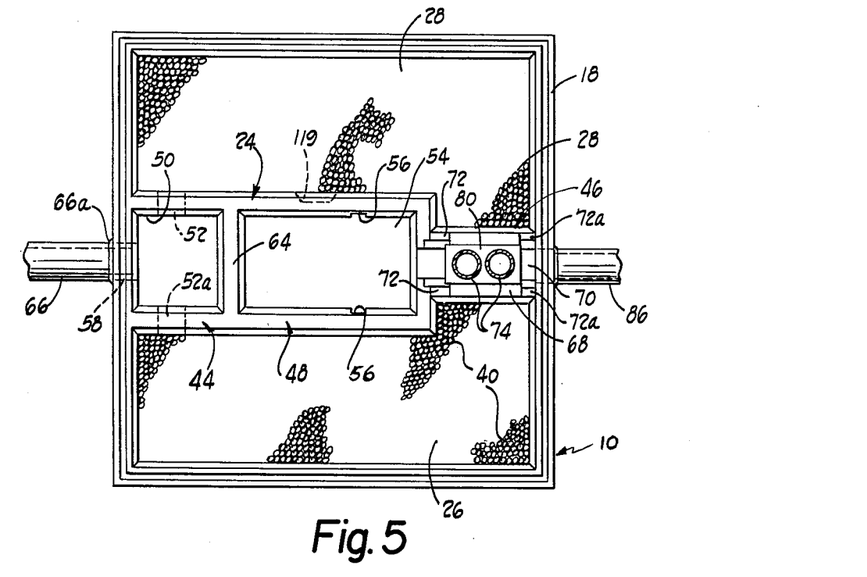
FIG. 5 is a view taken generally along the plane of line 5—5 of FIG. 1 looking in the direction of the arrows, and illustrating the filter beds.
Figures 6, 7:
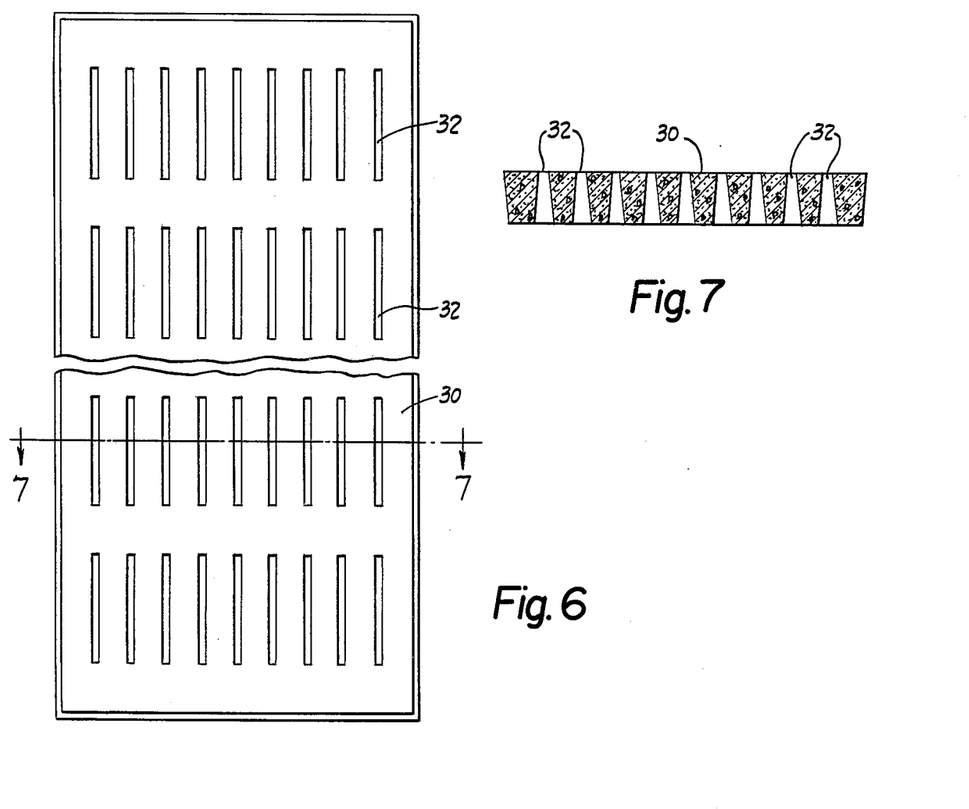
FIG. 6 is a broken, plan view of the concrete grating as seen in FIGS. 2 and 4.
FIG. 7 is a sectional view taken along the plane of line 7—7 of FIG. 6 looking in the direction of the arrows.

Referring to FIGS. 1 through 7, the upflow filter 10 includes a generally rectangular shaped concrete container 12, which may be reinforced in a manner well known. The container 12 is preferably cast as a unitary item and includes a bottom wall 14 (FIG. 2) and sidewalls 16, 18, 20 and 22 (FIG. 3). The container includes a concrete, central dividing wall structure 24, preferably integral with and extending between two opposed side walls 16 and 18, and forming first and second filtering chambers 26 and 28 (FIG. 5).

A cast concrete grating 30 (FIGS. 6 and 7) is positioned in each of the first and second filtering chambers 26, 28. Each grating comprises a generally rectangular-shaped, in plan, member having a plurality of openings or slots 32 therethrough. Slots 32 preferably diverge in a downward direction, as can be best seen in FIG. 7. These gratings, at their peripheral edges, rest upon a shoulder 34 (FIGS. 1, 2) which preferably extends completely around each of the filter chambers 26, 28. The concrete gratings serve to divide each of the chambers 26, 28 into a top portion 36 and a bottom portion 38 (FIG. 2). A layer of filtering material 40 is positioned on the upper surface of each of the gratings 30 over preferably the entire area thereof, with the filtering media comprising, for instance, smooth gravel having a diameter of from approximately ¼ inch to ⅜ inch.

As can be best seen in FIG. 1, the dividing wall structure 24 in side elevation comprises a generally L-shape configuration. Such dividing wall structure has first and second end portions 44 and 46 respectively, and an intermediate portion 48 (FIG. 5). As can be seen, the first end portion 44 and the intermediate portion 48 are preferably of a wider dimension in plan as compared to the second end portion 46 of the dividing wall structure, such second end portion on the low part of the L-shape.

As can be best seen in FIGS. 1 and 5, a vertical passage or opening 50 is cast into the dividing wall and extends through the first end portion 44 from the top edge thereof toward the bottom of the container. At the bottom of the opening 50, there are provided first and second lateral exit openings 52, 52a which communicate with the bottom of the second and first filtering chambers 28, 26 respectively. As can be best seen in FIG. 2, the bottom surface of each of the filtering chambers preferably slopes toward the respective opening 52, 52a, as viewed in end elevation.

The intermediate portion 48 of the dividing wall structure has a well or chamber 54 cast therein and extending from the top edge of the high portion of the L-shape configuration of dividing wall to the bottom of the container, as can be best seen in FIG. 1. The inner surfaces of the side wall portions of well or chamber 54 preferably have vertical slots 56 formed therein for a purpose to be hereinafter described. As can be best seen in FIGS. 1 and 5, all of the side walls of the vertical opening 50 and of the well or chamber 54 preferably slope inwardly in a downward direction, commencing generally adjacent the upper edge of the dividing wall.

A liquid inlet aperture 58 is provided in container 10 and serves via a pipe to connect the outlet 60 of a septic tank of for instance a home effluent plant 62, to the filter 10. As can be above seen in FIG. 1, the inlet 58 is disposed below the upper end of the downstream transverse wall 64 of the first mentioned end portion 44 of the dividing wall. Pipe 66 may extend into inlet 58 and connect the latter to the outlet 60 of the plant 62. Pipe 66 may be attached as at 66a to the wall 16 of the container.

A liquid conduit means 68 is provided on the top edge portion of the second end portion 46 of the dividing wall, with the liquid conduit means defining a channel or trough 70 adapted to receive therein liquid from the first and second filtering chambers of the filter mechanism. The channel 70 is generally of U-shape in cross sectional configuration (FIG. 2). The channel is provided with removable, relatively thin knock-out sections 72, 72a adjacent opposite ends of channel 70, in the side walls thereof, for providing, upon removal, weirs in the side walls of the channel so as to communicate the respective filtering chamber with the channel when the level of liquid L (FIG. 2) in the respective filtering chamber rises to a predetermined point so as to overflow via the respective weir into the channel.

Positioned in the channel 70 may be a pair of liquid treating chemical agent holders 74 which may comprise tubular members formed of some suitable material, such as for instance, plastic. The treating agent may be for instance tablets of a disinfecting material which may include for instance chlorine, with the tablets being adapted to be stacked into the respective holder member in magazine fashion, so that as the tablets are dissolved at the bottom of the holder member due to the contact with liquid in the channel, the tablets automatically feed down by gravity to the bottom portion of the holder. One form of available tablet is known as "Sanuril Tablets" obtainable from the Diamond Shamrock Corporation, but other chemical agents are also suitable.

As can be best seen in FIG. 1, the bottom portion of each holder is preferably provided with a plurality of spaced vertically extending slots 76, thereby defining finger portions and expeditiously exposing the tablets which are stacked in the holder, to the liquid flow in channel 70. The bottom portion of the holder member may be provided with an apertured end plate 76a which supports the treating agent thereon, and yet permits the liquid to flow readily through the plate into contact with the treating agent. The upper ends of the tubular members may be provided with a removable cap portions 78, which upon removal permit insertion of the treating agent into the holders. Coupling plates 80 co-acting between the upstanding holder members couple the latter together, and provide increased stability to the arrangement.

As can be best seen in FIG. 1, the transverse wall portion 82 defining the division between the well 54 and the channel 70 is provided with a vertical slot portion 82a disposed in line with the treating agent holder 74 and having a relatively thin knock-out section 82b therein (FIGS. 1 and 4) which upon removal, defines an opening communicating the channel 70 with the well 54 through the wall 82, for a purpose to be hereinafter described.

A fluid outlet 84 is formed in wall 18 of the container with such outlet being initially closed by a relatively thin knockout section 84a, cast integrally with the container, but which upon removal communicates channel 70 with outlet opening 84. A pipe 86 may be connected as at 86a to outlet 84, for conveying liquid from the filter to a more remote location.

It will be seen therefore that the aforementioned knockout sections 72, 72a, 83b and 84a provide for selective control over the flow of liquid from the filtering chambers 26, 28 into the channel 70, and thence either out the outlet 84, or into the well 54.

The liquid from the filter chambers as it flows through the conduit means or channel 70 is treated by the chemical agent in the holder members 74 for instance to chlorinate the liquid, prior to its leaving the filter. If the removable section 84a in the outlet is left in place, and instead the removable section 82b from the dividing wall 82 is removed, then the liquid in the channel instead of flowing out the outlet opening 84 will flow from the channel into the well 54. In this connection, if the liquid flowing into the channel 70 is to be directed into the well 54, then instead of knocking out the removable weir sections 72, the removable weir section 72a are removed, so that the liquid flow from the respective filtering chamber will flow through the weirs at the respective end of the channel and thence pass by the liquid treating agent in holders 74 prior to passing by gravity into the well 54 in the intermediate portion of the dividing wall. The bottom surface of the conduit means or channel 70 is substantially flat so that liquid can flow in either direction depending upon which removable section of the filter structure is removed, to direct the direction of flow of the liquid.

The operation of the filter may be as follows: Liquid leaving the home plant 62 via pipe 66 enters the inlet 58 of the filter and falls by gravity into the vertical opening 50 formed in the first mentioned end portion of the dividing wall, from whence it passes via lateral openings 52, 52a to the respective filtering chamber 28, 26, entering the bottom portions thereof. The liquid then travels up through the filtering media 40 where solids are filtered out and float down to remain in the bottom portion of the filtering chambers. As can be best seen in FIG. 2, the bottom interior surfaces of the container beneath the filtering grates 30 supporting the filtering beds, slope toward the longitudinal vertical center plane of the filter, so that the solids tend to move downwardly toward the lateral openings connecting the filtering chambers with the vertical opening 50. As the liquid flows up through the concrete grating, bacteria attaches to the stones in the filter beds making the stones in effect a biological filter which then tends to filter out and absorb smaller solids. The effluent from the home plant is preferably maintained at a high level of dissolved oxygen in order to keep the filter aerobic, with carbon dioxide being the main byproduct, thereby resulting in minimum odors.

The filtered liquid which passes through the top portion of each of the filtering chambers then exits the filter by overflowing for instance the weirs 72 at the left hand end of the channel means 70 and then along the channel and out the exit 84, assuming that the thin, removable section 84a has been removed from the exit opening. Thence, the fluid flows out the outlet pipe 86 into the ground. During its passage along the channel, the liquid is treated by the agent in holders 74.

It is necessary to appropriate intervals to clean the filter of the present invention, and one of the advantages of this filter is that this may be expeditiously done. A maintenance indicator 90 may be provided mounted by bracket 92 on the filter structure, and including a float 92a which extends downwardly into the vertical opening 50 in the first mentioned end portion 44 of the dividing wall, so that in the event that the filter beds 40 and/or the lateral openings 52, 52a connecting the vertical opening with the filtering beds become clogged, then the liquid coming from the home septic plant 62 will back up until it reaches a level which activates the float 92a and therefore directs a signal via cable 94 to a control panel board (not shown) to indicate via an indicator on the panel that cleaning of the filter mechanism is necessary. Cleaning may be accomplished by flushing out and raking the filter beds via access through the cover of the filter as will be hereinafter described.

A cast cover portion 96 which mates as at 96a with the open topped container is provided to close the container, with such cover including a removable cover section 98 providing immediate access to the maintenance indicator, as well as to the interior of vertical opening 50 in the dividing wall for cleaning purposes. Likewise, removable cover sections 98a and 98b are provided for selective access to respectively well 54 and channel section 70, including treating agent holders 74, for replenishment of the chemical agent as needed. Such cover sections are preferably disposed at approximately ground level, as illustrated in FIG. 1.

Figure 8:
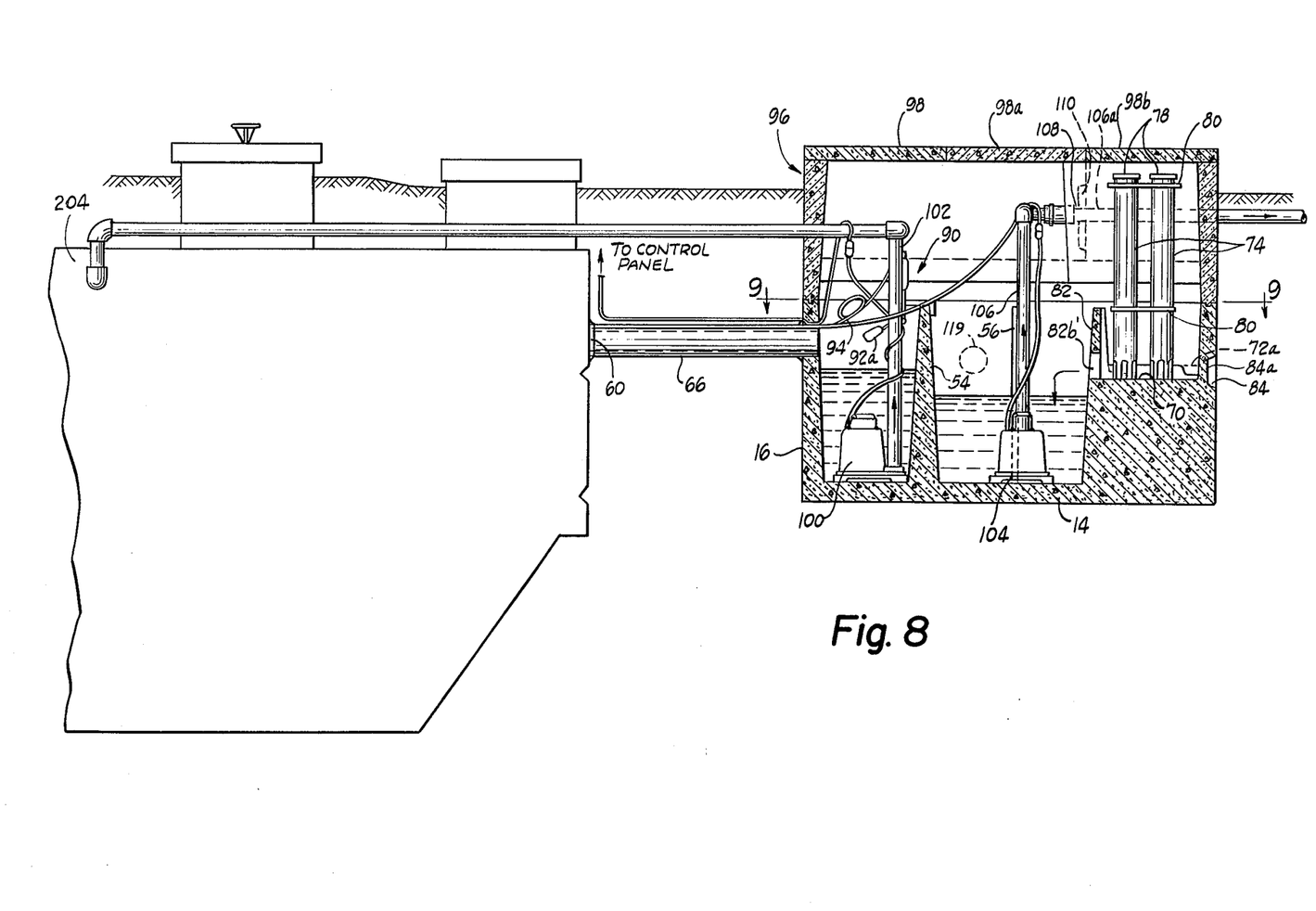
FIG. 8 is a sectional side elevational view illustrating a modified arrangement and after accomplishing removal of certain of the knock-out sections of the filter wall portions, and illustrating a backwashing pump and a lift pump included therewith.
Figure 9:
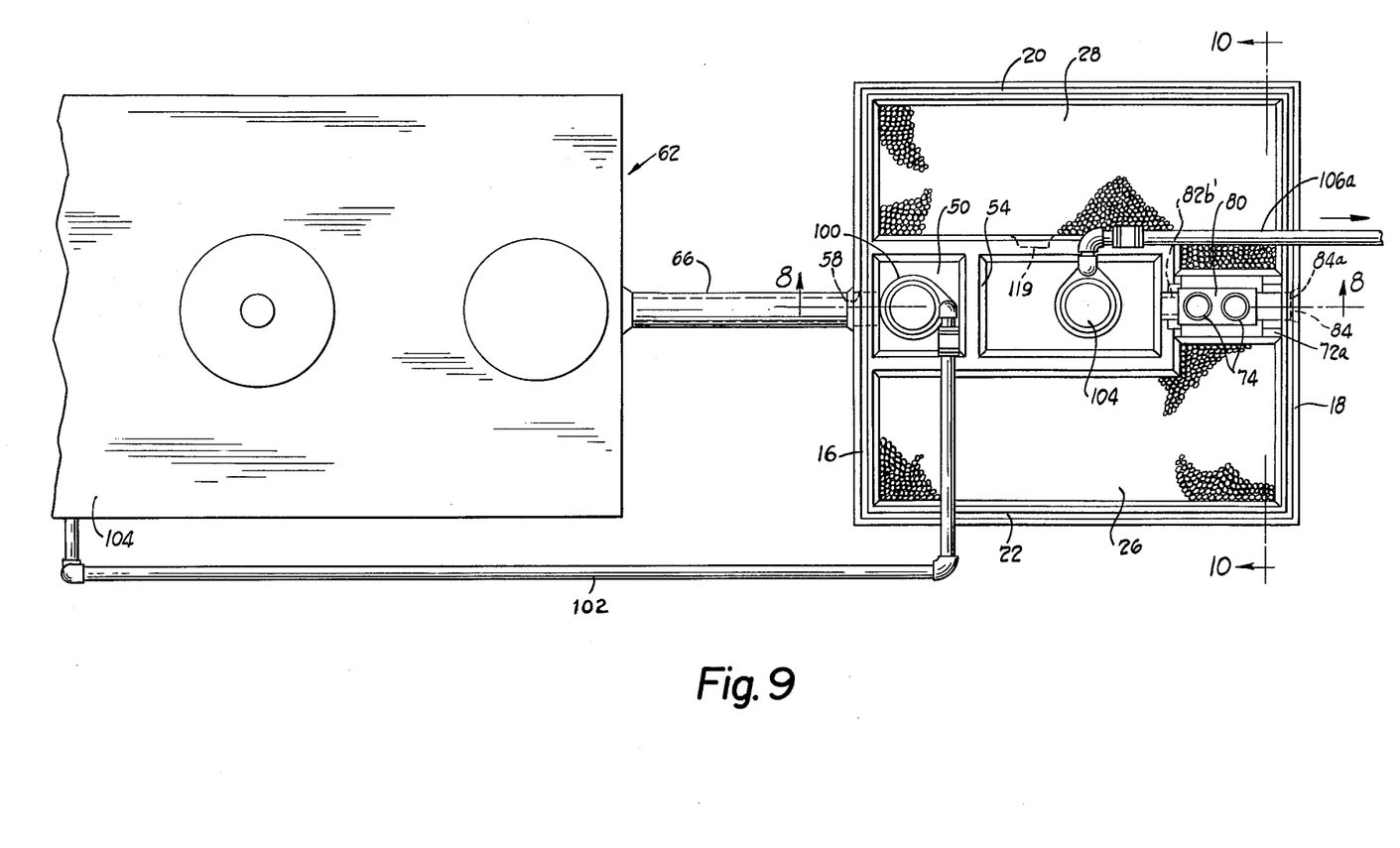
FIG. 9 is a top plan view taken generally along the plane of line 9—9 of FIG. 8 looking in the direction of the arrows.
Figure 10:
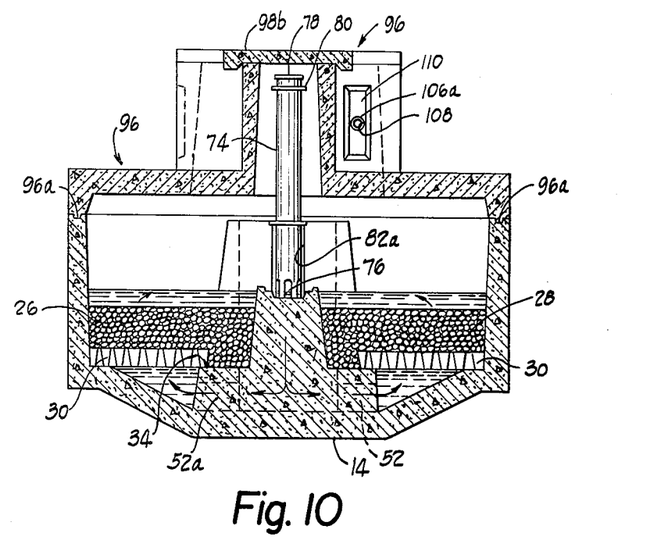
FIG. 10 is a sectional view taken generally along the plane of line 10—10 of FIG. 9 looking in the direction of the arrows.

Referring now to FIG. 8 and FIG. 9, there is shown a back wash flushing pump 100 permanently mounted in the vertical opening 50 in the first mentioned end portion of the dividing wall, with the back wash pump being disposed at the bottom most level of the vertical opening 50. The discharge portion of the submergible pump is provided with a vertically extending pipe section 102 which extends upwardly, and then laterally back to a pretreatment chamber 204 of the home sewage unit 62. Accordingly, any solids or solid material blocking the lateral passageways 52, 52a in the bottom of the tank will be sucked up by the pump and discharged through the pipe 102 back to the pretreatment chamber of the home unit, for passage once more through the system. It will be seen that the pump causes the liquid in the upper portion of the filtering chambers to be drawn downwardly through the filter beds, and into the bottom chamber portion during the back washing operation to cleanse the stones or material of the beds from solid matter and bacterial growth. Pump 100 may be automatically actuated periodically (for instance four times a 24 hour period) by an automatic timer which automatically turns the pump on for a predetermined time, and then off.

In the FIG. 8 and FIG. 9 embodiment, the removable section 82b in the dividing wall 82 between the well 54 and channel or passage 70 has been removed, instead of removing the section 84a sealing off outlet 84, whereby liquid from the filtering chambers 26, 28 in the channel, flows into the well 54. Also, the righthand end removable weir sections 72a are removed so that fluid from the filtering chambers 26, 28 flows into the righthand end of channel 70, past the agent holding means 74, and then through the opening 82b' formed from removal of the removable section means 82b in the dividing wall 82.

A submergible pump 104 is disposed in the well 54 with the intake port of the pump disposed at the lowermost level possible in the well. The pump 104 is operable to pump the liquid in the well up the pipe section 106 which is coupled to the discharge port of the pump, to horizontal pipe sections 106a and thence out an outlet opening 108 formed in the cover section 96 of the filter mechanism. Outlet 108 through which horizontal pipe section 106a extends may be closed over by a removable cover, or a removable web section 110 (FIGS. 1 and 2) formed integrally with the cover 96 and adapted to be "knocked out" or pierced to provide the outlet opening 108. It will be noted that the pump 104 in the well 54 is capable of discharging the liquid from the filter container at a higher level as compared to the level that would exist if removable section 84a of the outlet 84 was instead removed. Pump 104 may be automatically actuated to "on" condition responsive to a predetermined level of liquid in well 54, and then automatically turned off responsive to the liquid level dropping a predetermined amount.

Figure 11:
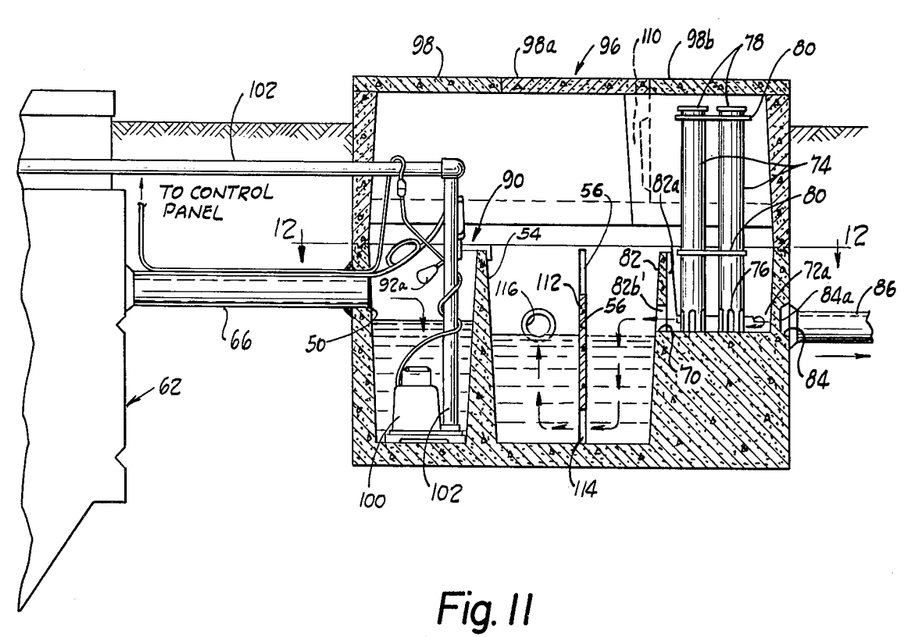
FIG. 11 is a sectional side elevational view of another embodiment of upflow filter.
Figure 12:
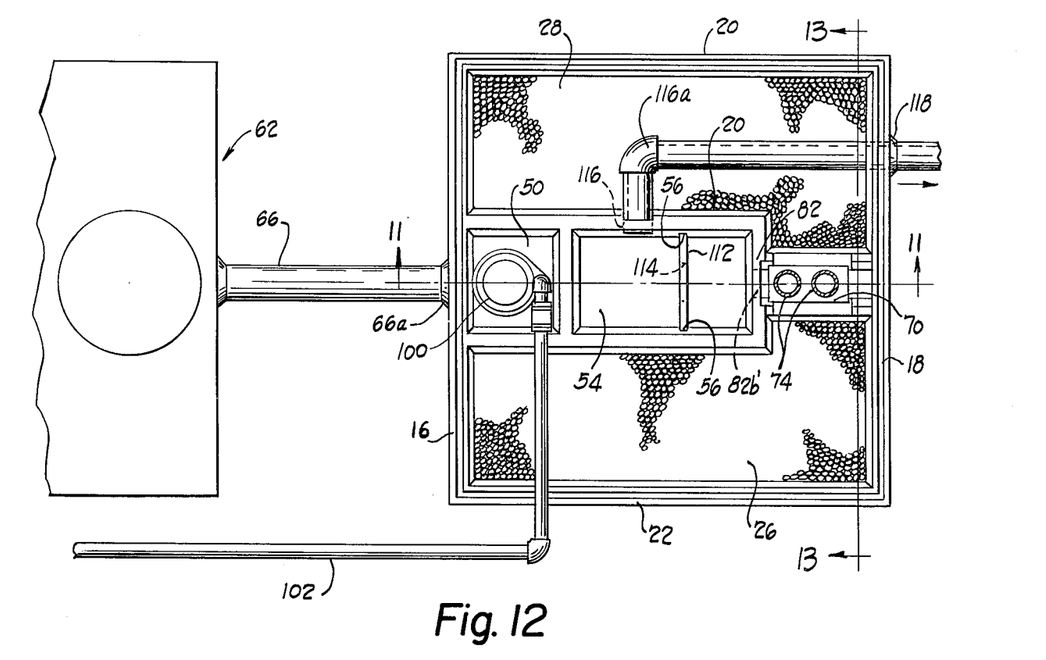
FIG. 12 is a sectional view taken generally along the plane of line 12—12 of FIG. 11 looking in the direction of the arrows.
Figure 13:
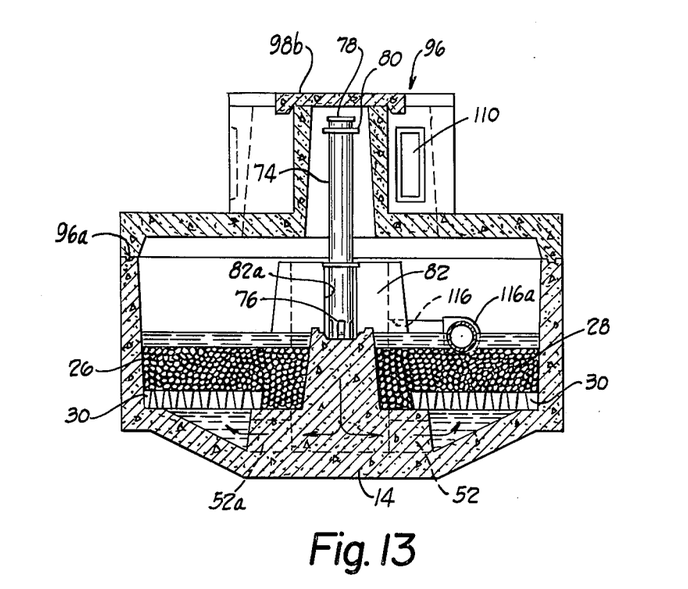
FIG. 13 is a sectional view taken generally along the plane of line 13—13 of FIG. 12 looking in the direction of the arrows.

Referring now to FIGS. 11, 12 and 13, there is shown another embodiment of the upflow filter structure. This embodiment has a clean out or back-wash pump 100 disposed in the vertical opening or passage 50 in the dividing wall, in a similar arrangement and for the same purpose as that of the filter mechanism shown in FIGS. 8 through 10. In this embodiment, the slots in the side walls of the well 54 thereof, receive and support a baffle plate 112 slidably disposed in such slots and extending between the side walls (FIGS. 11 and 12). Baffle plate 112 has at least one opening 114 adjacent the bottom thereof, whereby the liquid from the treating channel 70 passes through the knockout opening 82b' into the well 54 and then through the opening 114 in the baffle plate 112. When the level of the liquid in well 54 is sufficiently high, the liquid flows by gravity out of the exit opening 116 in the side wall of the well 54. A discharge pipe 116a is connected to the opening 116 and passes through the end wall 18 of the filter container, as at 118 (FIG. 12). The liquid emitting from the distal end of pipe 116a may drain into the soil. It will be noted that in this instance, the knockout section 84a blocking exit 84 is left in place, so that the liquid coming from the filter chambers 26, 28 via the knockout weir openings 72a into the channel 70, flows into the well 54 rather than out discharge opening 84. Also, the aforementioned exit opening 116 is initially closed by a knock-out web section 119 (FIGS. 1, 5 and 8) which is removed when the filter is adapted to the FIGS. 11-13 embodiment.

Dividing the well 54 by means of the baffle 112 helps to maintain a high concentration of the treating agent chemical from holders 74 in the righthand end (as viewed in FIG. 11) of the well, so that as the liquid from the filtering chambers passes by the treating agent containers 74 and into the righthand end section of the well, the liquid is subjected to a considerable concentration of treating agent, such as for instance chlorine, prior to passing the baffle to the aforementioned exit opening 116.

It will be understood that another embodiment of filter, similar to the FIGS. 1 through 5 embodiment of filter could be provided, except that the latter would include a backwashing pump 100 disposed in the inlet chamber 50 for backwashing the filters. The remainder of the filter arrangement could be the same. In other words, the liquid from the filtering chambers would pass through the knockout weir openings 72 and flow out the outlet pipe 86 after the outlet knockout section 84a was removed.

From the foregoing description and accompanying drawings it will be seen that the invention provides a novel upflow filter and method, usable with a home sewage treatment plant, and with the filter including a container comprising a dividing wall extending thereacross dividing the container into a plurality of filtering chambers, and with there being provided a vertical opening or passage in the dividing wall in communication with the inlet to the container, with the passage having lateral exit openings communicating the vertical passage with the respective filtering chamber adjacent the bottom thereof, and wherein another portion of the dividing wall along its top downstream from the inlet passage defines a channel adapted to receive liquid from the filtering chambers, and with removable means providing weirs in the channel for providing for selective entrance of liquid into the channel from the filtering chambers, and wherein the filter construction has other knock-out sections therein that can be selectively removed, so that the filter can be adapted to different job requirements, thereby enabling one filter construction to be stocked by a supplier and which can be adapted on the site to the selected job requirement.

The terms and expressions which have been used, are used as terms of description, and not of limitation, and there is no intention in the use of such terms and expressions of excluding any equivalents of any of the features shown or described, or portions thereof, and it is recognized that various modifications are possible within the scope of the invention claimed.

What is claimed is:

1. An upflow filter including in combination a generally rectangular-shaped, one piece, concrete container, having an open top, a bottom wall, and four side walls, said container comprising a concrete dividing wall extending between two opposed side walls of said container thereby forming first and second filtering chambers, said dividing wall having first and second end portions and an intermediate portion therebetween, said first end portion and said intermediate portion each having a top edge portion which is at a higher vertical level than a top edge portion of said second end portion, said dividing wall comprising a generally L-shape in side elevational view with said top edge portion of said first end portion and said intermediate portion being on the high part of the L-shape and the top edge portion of said second end portion being on the low part of the L-shape, said first end portion having a vertical opening extending therethrough from said top edge portion substantially to the bottom of said container and having first and second lateral exit portions communicating with said first and second filtering chambers adjacent the bottoms thereof, a liquid inlet in said container communicating with said vertical opening, a grating positioned in each of said first and second filtering chambers and dividing each into top and bottom portions, filtering material on said grating for filtering liquid passing between said bottom and top portions of each chamber, a liquid outlet from said container, conduit means on the top edge portion of said second end portion of said dividing wall and defining a liquid flow passage, removable means in said conduit means to provide for the entrance of liquid from said first and second chambers into said passage, said intermediate portion having a vertical well therein extending from said top edge portion thereof to a level below said passage, other removable means coacting between said conduit means and said well, and between said conduit means and said outlet, to selectively connect said passage either directly to said well or directly to said outlet, removal of at least certain of said removable means permitting liquid from said first and second chambers to flow into said passage and then via said passage to either said well or said outlet.

2. A filter in accordance with claim 1 wherein said removable means comprise frangible closures cast integrally with said container.

3. A filter in accordance with claim 2 wherein said closures comprise relatively thin concrete sections.

4. A filter in accordance with claim 1 including another outlet from said container disposed at a different level as compared to the first mentioned outlet, and pump means disposed in said well and operative to pump liquid from said well to said other outlet.

5. A filter in accordance with claim 1 including pump means disposed in said vertical opening for backwashing said filter.

6. A filter in accordance with claim 5 including pump means disposed in said well for pumping liquid therefrom responsive to a predetermined level of liquid in said well.

7. A filter in accordance with claim 5 wherein said pump means includes control means for automatically actuating said pump means.

8. A filter in accordance with claim 1 including holder means disposed in said passage, said holder means being adapted to receive a supply of chemical treating agent therein.

9. A filter in accordance with claim 1 wherein said first end portion and said intermediate portion are of a greater width as compared to said second end portion of said dividing wall.

10. A filter in accordance with claim 1 wherein said well is defined by transverse wall portions and longitudinally extending wall portions, said transverse wall portions being at a lower height than said longitudinally extending wall portions whereby in the event of a blockage of said lateral exit portions, the liquid from said inlet to the first mentioned vertical opening will overflow said defining transverse wall portions of said well without flowing into said filtering chambers.

11. A filter in accordance with claim 1 wherein the bottom defining surface of said well and the bottom defining surface of the first mentioned opening are at substantially the same level and at a lower elevation than the bottom defining surface of said passage.

12. A filter in accordance with claim 1 including a cover closing said open top.

13. A filter in accordance with claim 1 wherein said well is defined in part by transverse wall portions extending between longitudinal wall portions of said dividing wall, the furthermost downstream transverse wall portion defining said well separating said well from said passage, said removable means coacting between said well and said conduit means comprising a relatively thin concrete section in said furthermost downstream transverse wall portion, adapted upon removal to communicate said passage with said well, said removable means coacting between said conduit means and said outlet likewise comprising a relatively thin concrete section separating said outlet from said conduit means.

14. An upflow filter including in combination a container, a dividing wall in said container forming first and second filtering chambers, said dividing wall having first and second end portions and an intermediate portion therebetween, said first end portion of said dividing wall having a vertical opening extending thereinto from a top portion thereof to a bottom portion thereof and having exit portions communicating with said first and second filtering chambers at bottom portions thereof, a liquid inlet in said container communicating with said vertical opening, filtering means positioned in each of said first and second filtering chambers and dividing each into top and bottom portions, a liquid outlet from said container, conduit means at the top portion of said second end portion of said dividing wall and defining a liquid flow passage, removable means in said conduit means to provide for the entrance of liquid from said first and second chambers into said passage, said intermediate portion of said dividing wall having a vertical well therein extending to a level below the level of said passage, other removable means coacting between said conduit means and said well, and between said conduit means and said outlet, to selectively connect said passage either directly to said well or directly to said outlet, removal of at least certain of said removable means permitting liquid from said first and second chambers to flow into said passage and then via said passage to either said well or said outlet.

15. A filter as claimed in claim 14 wherein said conduit means has first and second end portions and said first mentioned removable means is provided in each of said first and second end portions of said conduit means, chemical treatment means in said conduit means between said first mentioned removable means in said first and second end portions of said conduit means, removal of said first mentioned removable means at said first end portion of said conduit means and removal of said other removable means between said conduit means and said well permitting liquid flow from said filtering chambers and past said chemical treatment means directly to said well, removal of said first mentioned removable means at said second end portion of said conduit means and removal of said other removable means between said conduit means and said outlet permitting liquid flow from said filtering chambers and past said chemical treatment means directly to said outlet.

16. A filter in accordance with claim 14 including another outlet from said container disposed at a different level as compared to the first mentioned outlet, and pump means disposed in said well and operative to pump liquid from said well to said other outlet.

17. A filter in accordance with claim 14 including pump means disposed in said vertical opening for backwashing said filter.

18. A filter in accordance with claim 17 including pump means disposed in said well for pumping liquid therefrom responsive to a predetermined level of liquid in said well.

19. A filter in accordance with claim 14 including holder means disposed in said passage, said holder means being adapted to receive a supply of chemical treating agent therein.

* * * * *